US012314301B2

(12) United States Patent
Chandel et al.

(10) Patent No.: US 12,314,301 B2
(45) Date of Patent: May 27, 2025

(54) CODE SEARCH FOR EXAMPLES TO AUGMENT MODEL PROMPT

(71) Applicant: MICROSOFT TECHNOLOGY LICENSING, LLC., Redmond, WA (US)

(72) Inventors: Shubham Chandel, Vancouver (CA); Colin Bruce Clement, Seattle, WA (US); Shengyu Fu, Redmond, WA (US); Neelakantan Sundaresan, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 18/237,720

(22) Filed: Aug. 24, 2023

(65) Prior Publication Data

US 2025/0068665 A1    Feb. 27, 2025

(51) Int. Cl.
*G06F 17/00*    (2019.01)
*G06F 7/00*    (2006.01)
*G06F 16/338*    (2019.01)

(52) U.S. Cl.
CPC ................... *G06F 16/338* (2019.01)

(58) Field of Classification Search
CPC ..................................... G06F 16/338
USPC ......................................... 707/769
See application file for complete search history.

(56) References Cited

U.S. PATENT DOCUMENTS

| | | | | |
|---|---|---|---|---|
| 2002/0184373 | A1* | 12/2002 | Maes | G10L 15/30 704/E15.047 |
| 2005/0137868 | A1* | 6/2005 | Epstein | G10L 15/183 704/252 |
| 2007/0233692 | A1* | 10/2007 | Lisa | G06F 16/338 |
| 2012/0016678 | A1* | 1/2012 | Gruber | G06N 3/006 704/E21.001 |
| 2019/0385711 | A1* | 12/2019 | Shriberg | G09B 19/00 |
| 2020/0117446 | A1 | 4/2020 | Smith et al. | |
| 2020/0159778 | A1* | 5/2020 | Mohanty | G06Q 30/0282 |
| 2021/0334300 | A1* | 10/2021 | Banda | G06N 3/08 |
| 2022/0197900 | A1* | 6/2022 | Maheshwari | G06F 16/90324 |
| 2022/0309332 | A1* | 9/2022 | V V Ganeshan | G06F 40/30 |
| 2022/0318283 | A1* | 10/2022 | Mishra | G06F 16/31 |
| 2023/0196021 | A1* | 6/2023 | Guttappa | G06F 40/205 704/9 |
| 2023/0252059 | A1* | 8/2023 | Nussinovitch | G06N 3/09 707/769 |

(Continued)

OTHER PUBLICATIONS

"Regular Expression Operations", Retrieved from: https://docs.python.org/3/library/re.html, Jul. 25, 2023, 23 Pages.

(Continued)

*Primary Examiner* — Pavan Mamillapalli

(57) ABSTRACT

A user query for information regarding data of a codebase is answered by a large language model given a prompt that includes examples of code segments from the codebase that are similar to the user query. The code segments from the codebase are associated with metadata that includes both natural language text and source code. The search for the examples of code segments from the codebase is based on embeddings of code segments and associated metadata that are closely similar to an embedding of the user query and context.

20 Claims, 8 Drawing Sheets

(56) References Cited

U.S. PATENT DOCUMENTS

| | | | | |
|---|---|---|---|---|
| 2024/0202539 A1* | 6/2024 | Poirier | ................. | G06F 16/345 |
| 2024/0265281 A1* | 8/2024 | Hart | ....................... | G06F 40/58 |
| 2024/0273309 A1* | 8/2024 | Heller | ..................... | G06F 40/56 |
| 2024/0338746 A1* | 10/2024 | Ahuja | ............... | G06Q 30/0631 |
| 2024/0345551 A1* | 10/2024 | Ramanasankaran | ....................... | G06N 3/0895 |
| 2024/0346459 A1* | 10/2024 | Brown | .................. | G06Q 10/20 |

OTHER PUBLICATIONS

Karpathy, et al., "MinGPT", Retrieved from: https://github.com/karpathy/minGPT, Jan. 8, 2023, 6 Pages.

International Search Report and Written Opinion received for PCT Application No. PCT/US2024/038265, Nov. 18, 2022, 11 pages.

Ling, et al., "Adaptive Deep Code Search", Proceedings of the 28th International Conference on Program Comprehension, Jul. 13, 2020, pp. 48-59.

\* cited by examiner

MODEL RESPONSE 302

TO BUILD A BPE ENCODER, YOU CAN USE THE 'GET_ENCODER( )' FUNCTION DEFINED IN THE 'MINGPT/BPE/PY' FILE. THIS FUNCTION LOADS THE 'ENCODER.JSON' AND 'VOCAB.BPE' FILES, CONSTRUCTS AN 'ENCODER' OBJECT AND RETURNS IT. YOU CAN THEN USE THIS 'ENCODER' OBJECT TO ENCODE TEXT USING THE 'ENCODE' METHOD. HERE IS AN EXAMPLE:

```python
FROM MINGPT.BPE IMPORT GET_ENCODER
#GET THE ENCODER OBJECT
ENCODER = GET_ENCODER()
#ENCODE A STRING
TEXT = "HELLO, WORLD!"
ENCODED_TEXT = ENCODER.ENCODE (TEXT)
PRINT (ENCODED_TEXT)
```

THIS WILL OUTPUT A LIST OF INTEGERS THAT CORRESPOND TO THE ENCODED TEXT.

PROMPT 300

304
USER QUERY: 'HOW TO BUILD BPE ENCODER?"
CONTEXT: HTTPS://GITHUB.COM/KARPATHY/MINGPT

EXAMPLE 306

308 — FILE: MINGPT/BPE.PY

310 — CLASS DEFINITION:
...

312 — CLASS BPETOKENIZER:

314 — DOCSTRING: >PYTORCH-AWARE CLASS THAT WRAPS THE ENCODER ABOVE

316 — METHOD:
```
DEF DECODE (SELF, IDX):
    #ENSURE A SIMPLE 1D TENSOR FOR NOW
    ASSERT IDX.NDIM == 1
    #DECODE INDICES TO TEXT
    TEXT = SELF.ENCODER.DECODE(IDX.TOLIST ())
    RETURN TEXT
```
...

318 — SUMMARY: THE 'BPE TOKENIZER' CLASS HAS A 'DECODE' METHOD THAT TAKES IN AN INDEX TENSOR AND DECODES IT TO TEXT USING THE 'DECODE' METHOD OF THE 'ENCODER' OBJECT. THE METHOD FIRST CHECKS THAT THE INPUT TENSOR IS 1-DIMENSIONAL AND THEN CONVERTS IT TO A LIST BEFORE PASSING IT TO THE 'DECODE' METHOD OF THE 'ENCODER' OBJECT. FINALLY, THE DECODED TEXT IS RETURNED.

320 — POSSIBLE DEVELOPER QUERIES FOR THIS CODE COULD BE:
1. WHAT IS THE 'ENCODER' OBJECT AND HOW IS IT INITIALIZED?
2. CAN THE 'DECODE' METHOD HANDLE MULTI-DIMENSIONAL TENSORS?
3. IS THERE ANY PREPROCESSIG REQUIRED BEFORE PASSING THE TEXT TO THE 'ENCODER' OBJECT?

*FIG. 3*

```
500
```

```
                    ┌─────────┐
                    │  START  │
                    └────┬────┘
                         ▼
┌────────────────────────────────────────────────────────────────────┐
│ DO FOR EACH FILE IN CODEBASE 502                                   │
│                                                                    │
│   ┌──────────────────────────────────────────────────────────────┐ │
│   │          SPLIT EACH FILE INTO CODE SEGMENTS 504              │ │
│   │   * FOR CODE-BASED FILE, SPLIT BASED ON SYNTAX HIERARCHY     │ │
│   │   *FOR TEXT-BASED FILE, SPLIT TEXT INTO ROLLING WINDOWS      │ │
│   │   *FOR MARKUP LANGUAGE FILES, SPLIT INTO HEADERS AND SUB-HEADERS │
│   └──────────────────────────────────────────────────────────────┘ │
│                                                                    │
│   ┌──────────────────────────────────────────────────────────────┐ │
│   │ FOR EACH CODE SEGMENT 506                                    │ │
│   │   ┌────────────────────────────────────────────────────────┐ │ │
│   │   │ OBTAIN CODE SUMMARY AND PREDICTED QUERIES FOR THE      │ │ │
│   │   │ CODE SEGMENT 508                                       │ │ │
│   │   └────────────────────────────────────────────────────────┘ │ │
│   │                                                              │ │
│   │   ┌────────────────────────────────────────────────────────┐ │ │
│   │   │ GENERATE METADATA TO ANNOTATE THE CODE SEGMENT 510     │ │ │
│   │   └────────────────────────────────────────────────────────┘ │ │
│   │                                                              │ │
│   │   ┌────────────────────────────────────────────────────────┐ │ │
│   │   │ GENERATE AN EMBEDDING FOR THE CODE SEGMENT BASED ON ITS│ │ │
│   │   │ METADATA AND CODE SEGMENT 512                          │ │ │
│   │   └────────────────────────────────────────────────────────┘ │ │
│   │                                                              │ │
│   │   ┌────────────────────────────────────────────────────────┐ │ │
│   │   │ STORE METADATA AND CODE SEGMENT IN CODEBASE SEGMENT    │ │ │
│   │   │ TABLE INDEXED BY RESPECTIVE EMBEDDING 514              │ │ │
│   │   └────────────────────────────────────────────────────────┘ │ │
│   └──────────────────────────────────────────────────────────────┘ │
└────────────────────────────────┬───────────────────────────────────┘
                                 ▼
                         ┌──────────┐
                         │  RETURN  │
                         └──────────┘
```

*FIG. 5*

CODE SEARCH FOR EXAMPLES TO AUGMENT MODEL PROMPT

BACKGROUND

A large language model (LLM) is a type of machine learning model trained on a massively-large training dataset of text and/or source code resulting in the model containing billions of parameters. The large language model is used to perform various tasks such as natural language processing, text generation, machine translation, and source code generation. The large language model is based on deep learning neural networks such as a neural transformer model with attention.

The large language model is typically given a user prompt that consists of text in the form of a question, an instruction, short paragraph and/or source code that instructs the model to perform a task and/or the format of the intended response. However, when the task pertains to code elements of a codebase that the model has not been seen before during training, the large language model performs poorly generating vague and/or useless responses.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user query pertaining to a codebase is answered by a large language model not trained on the source code of the codebase. A prompt is given to the large language model that includes the user query and a context which includes the identity of the codebase and examples from the codebase that are similar to the user query. The examples come from a codebase segment table of the codebase. The codebase segment table includes code segments from each file of the codebase with its related metadata. A code segment may include a file of the codebase, a class of a file of the codebase, and a method of a file of the codebase.

The codebase segment table is indexed by an embedding for each combination of a code segment and its associated metadata. A search of the codebase is made to find one or more code segments and metadata that are closest to the user query using an embedding of the user query and context. The code segments having the closest embeddings to the embedding of the user query and context is used as the example in the prompt.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 3 is an example of a conversation with a large language model employing a user prompt comprising a query, context, and example and a model response.

FIG. 5 is a flow chart illustrating an example of a method for generating the codebase segment table.

DETAILED DESCRIPTION

Overview

A prompt to a large language model for information regarding data of a codebase includes source code segments from the codebase and associated metadata having a close similarity to the intent of the prompt. The intent of the prompt is the task the model is to perform which takes the form of a query and a context. The query is a question, instruction, or short paragraph that describes the task and the context is the identity of the codebase (e.g., location, URI, file path, etc.) that is the subject of the query.

Code segments of the files of the codebase are stored in a codebase segment table along with their respective metadata. A code segment in the codebase segment table is indexed by an embedding that represents the code segment and its associated metadata. An embedding of the query and context is used as a search index to find closely-similar embeddings from the codebase segment table. The top-k closest embeddings to the embedding of the query and context point to the code segments and metadata from the codebase segment table to include as examples in the prompt to the large language model.

Large language models have powerful reasoning capabilities having been trained on terabytes of source code and natural language. In an aspect, the large language model is a pre-trained on a large volume of source code and natural language text from a variety of publicly-available sources. The use of the examples having a close similarity to the query and context in the prompt allows the large language model, not having seen the code segments from the files of the codebase during training, to make more accurate inferences using the information the model has been trained to predict. The prompt is beneficial in situations where the codebase is not publicly accessible and not likely to have been seen by the model during training.

In addition, the inclusion of the examples from the codebase allows the model to predict a response that includes code elements from the codebase, such as method names, application programming interfaces (APIs), objects, variable names, etc. and code references, such as local file paths, etc. The inclusion of the codebase's code elements and code references makes the response more specific to a codebase that is the subject of the user's query.

Attention now turns to a more detailed description of the system, device, and methods of the code search for the examples to augment the prompt to a large language model.

System

Figure 1:
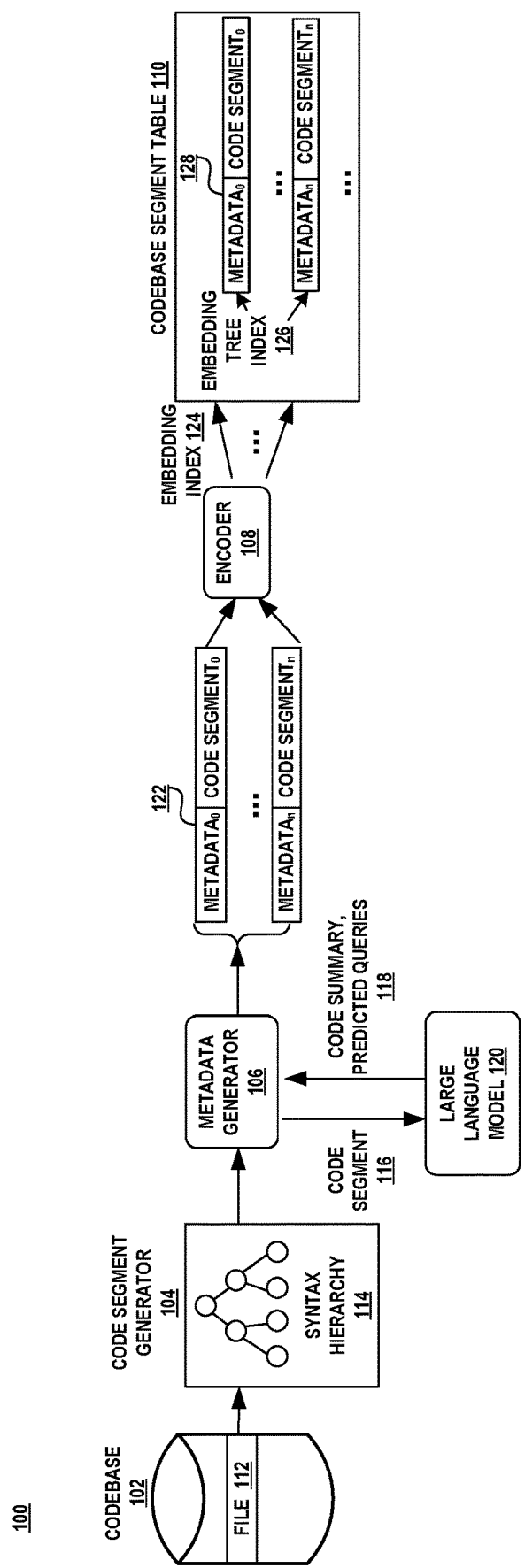
FIG. 1 illustrates an example of a system for generating a codebase segment table.

FIG. 1 illustrates an example of a system 100 for the generation of the codebase segment table. The system 100 includes a codebase 102, a code segment generator 104, a metadata generator 106, an encoder 108, a codebase segment table 110, and a large language model 120. The codebase 102 is a collection of related files for a source code component, program, or system including the files used to compile, test, maintain, configure, and/or build the source code component, program or system, such as, without limitation, script files, readme files, license info files, etc. The codebase 102 may be hosted on a source code repository in a version control system (i.e., GitHub/Git), local repository, cloud service, etc.

The code segment generator 104 extracts code segments from each file 112 of the codebase 102. A code segment is defined by a syntax hierarchy 114. In an aspect, the syntax hierarchy 114 defines a code segment to include a whole file, a whole class, and a single method. The metadata generator 106 extracts the metadata associated with a code segment 122. The metadata includes a filename, the local file path, the Git commit branch or hash, the line number of the start of the code segment, class and namespace information for class methods and objects in namespaces, a natural language code summary of the code segment, and predicted queries. The natural language code summary of the code segment and the predicted queries 118 are generated by the large language model 120 given the code segment 116.

The encoder 108 takes an input sequence of tokens consisting of a code segment and its metadata and produces a fixed-length vector representation referred to as an embedding or encoding. The embedding captures the semantic relationships between the tokens and places similar inputs close together in an embedding space. In an aspect, the encoder 108 is an encoder-only neural transformer model with attention. The encoder 108 generates an embedding for each code segment and its associated metadata which is then used as an embedding index 124. Each code segment, its associated metadata 128 is stored in the codebase segment table 110. An embedding tree index 126 is used to access a respective code segment and its metadata.

The embedding tree index 126 is based on the embeddings of the code segment and its metadata and used to perform a quick search on the codebase segment table. A file of the codebase is segmented by concrete syntax tree into semantic code segments like methods, classes, and class methods. The code segments are then annotated with metadata like file path, namespace, generated summary, generated keywords, line number start, and perhaps the class name for class methods. These annotated code segments are then embedded, and the embeddings are fed into an approximate nearest neighbor (ANN) tree data structure which enables faster ranking of embedded queries. The ANN data structure or embedding tree index 126 takes the embedding of a query/context and returns a ranked list of indices representing code segments/metadata, and the most relevant code segments/metadata are used as the examples provided in the prompt.

Figure 2:
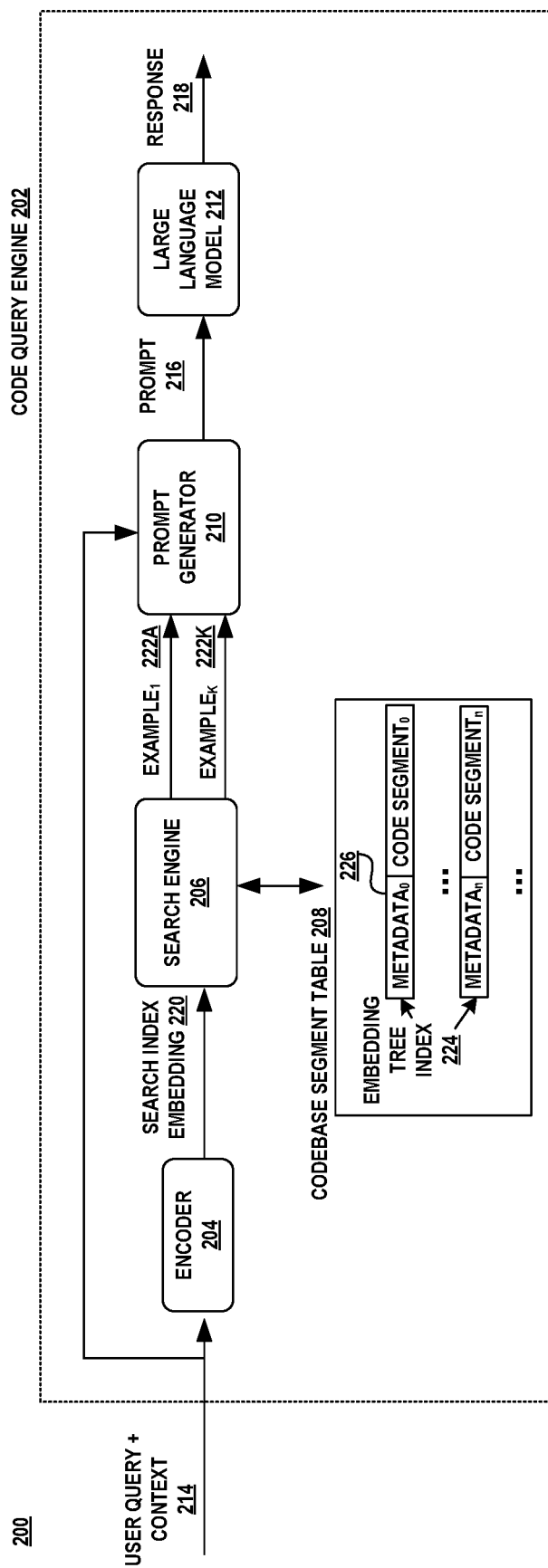
FIG. 2 illustrates an example of a system for generating a prompt to a large language model where the prompt is augmented with examples.

FIG. 2 illustrates an example of a system 200 for the generation of a prompt to a large language model including one or more examples extracted from the codebase segment table. The system includes a code query engine 202 having an encoder 204, a search engine 206, the codebase segment table 208, a prompt generator 210 and a large language model 212. The code query engine 202 receives a query and context 214 from an application or user interface. The code query engine 202 generates the prompt 216 for the large language model 212 to generate a response 218.

The encoder 204 transforms the query and context 214 into a search index embedding 220. The search engine 206 utilizes the search index embedding 220 to find the top-k closely-similar embeddings using the embedding tree index 224 of the codebase segment table 208. The metadata and code segments 226 associated with the top-k closely-similar embeddings are extracted and used as the examples 222A-222K.

The prompt generator 210 generates a prompt 216. The prompt generator 210 uses the examples 222A-222K, the user query, and the context, and the examples to form a prompt 216 that is transmitted to the large language model 212. The large language model 212 returns a response 218 given the prompt 216.

In an aspect, the large language model 212 is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention. In an aspect, the large language model is configured as an encoder-decoder neural transformer model with attention having a series of stacked encoder blocks coupled to a series of stacked decoder blocks. In another aspect, the large language model consists only of stacked decoder blocks. In addition, the large language model may be trained to perform different tasks and may be configured with different model sizes.

In an aspect, the large language model is pre-trained on natural language text and source code. The training of a large language model requires a considerable amount of training data and computing resources which makes it impossible for some developers to create their own models. The large language model consists of billions of parameters (e.g., weights, embeddings) and trained on terabytes of data. Examples of the large language models include the conversational pre-trained generative neural transformer models with attention offered by OpenAI (i.e., chat GPT models), Codex CoPilot, and other large language models.

FIG. 3 illustrates an exemplary prompt 300 to the large language model and the model's response 302. In an aspect, the large language model resides on a remote server and receives the prompt at an endpoint of a server hosting the large language model via a network. The user and the large language model may engage in a conversation that consists of several prompts and responses within a single network session.

As shown in FIG. 3, the prompt includes the user query and context 304 and a single example 306. It should be noted that although FIG. 3 shows only a single example, the technique described herein is not limited to a single example and may include multiple examples.

The user query 304 consists of a question, 'How to Build a BPE Encoder?' and the context 304 includes a URL to a location in GitHub that contains a codebase MinGPT, https://Github.com/Karpathy/MinGPT. The example 306 consists of the code segment which is the Python method, decode, 316 and its metadata. The metadata includes the following: the filename of the code segment 308, mingpt/bpe.py, the class definition 310 of the code segment, the class BPETOKENIZER 312 which includes the code segment, the docstring 314 of the decode method, the code summary 318, and the predicted developer queries for the code segment 320.

The model's response 302 includes specific references found in the codebase. For example, the model's response includes the function name of the get_encoder ( ) method in the file 'mingpt/bpe.py' file of the codebase, a detailed description of the get_encoder ( ) method that includes the files and objects the method uses (e.g., encoder.json, vocab.bpe, encoder object), an example of the method, and a description of the output of the method.

Due to the inclusion of the example in the prompt, the model's response contains specific code elements from the codebase even though the model was not trained on the code from the codebase. The inclusion of the example in the prompt allows the model to produce a more useful response since it contains code elements from a specific codebase.

Methods

Attention now turns to description of the various examples of methods that utilize the system and device disclosed herein. Operations for the aspects may be further described with reference to various examples of methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
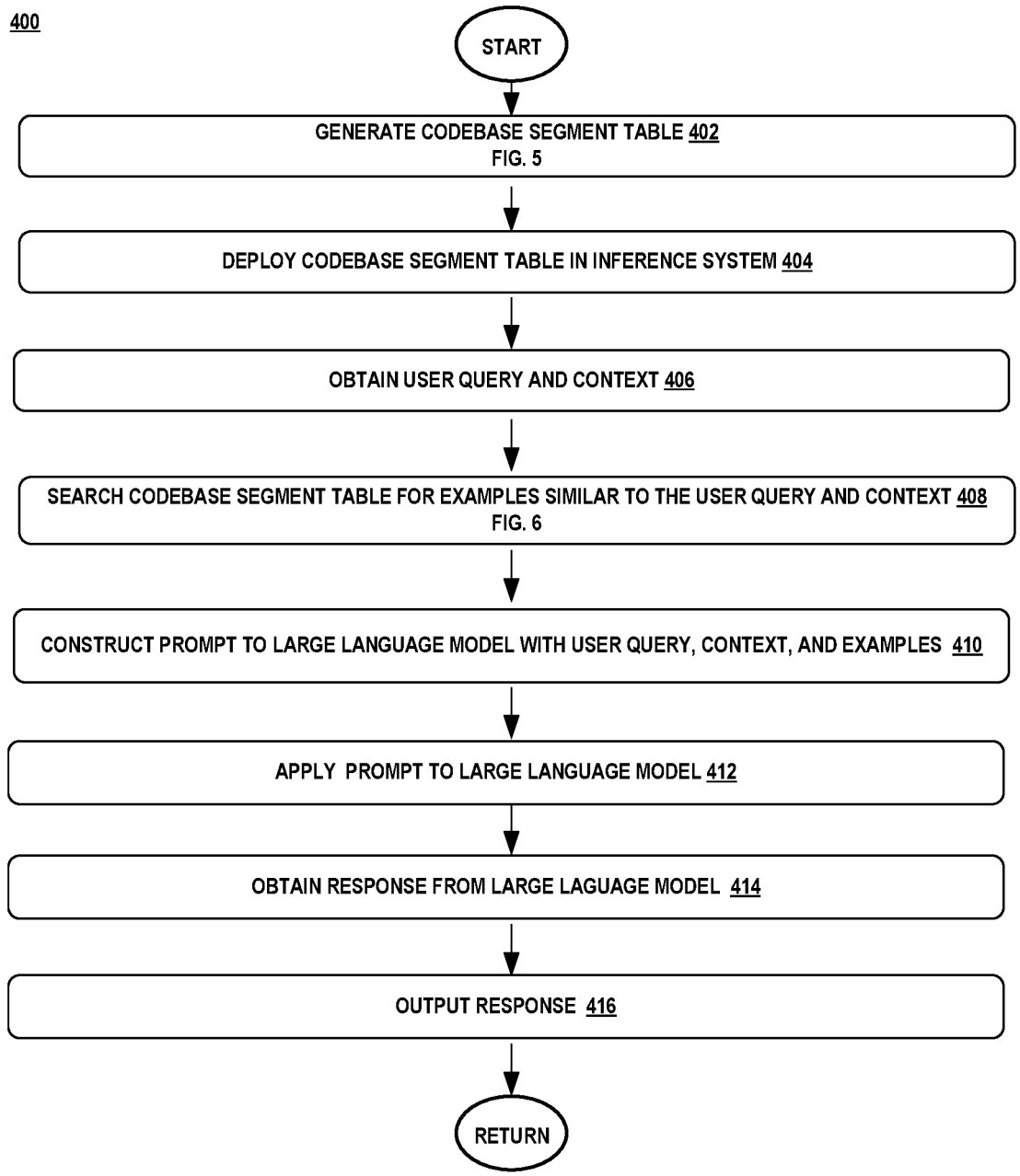
FIG. 4 is a flow chart illustrating an example of a method that searches for examples to augment a model prompt and generates the model prompt.

FIG. 4 illustrates an example of a method 400 of the system. Initially, the codebase segment table is generated (block 402). Turning to FIG. 5, there is shown an example of a method 500 for generating the codebase segment table. The code segment generator scans each file in a codebase (block 502). The codebase contains source code files in addition to script files (i.e., markdown files) and documentation files. Each file is classified in accordance to its type, such as source code file written in certain programming language, a script file written in a particular scripting language, or a natural language text file.

Each file of the codebase is split into one or more code segments (block 504). Files containing natural language text or unsupported programming languages are split into rolling windows. The rolling window is computed by first tokenizing the file with a tokenizer, and then splitting it into code segments of the same contiguous number of tokens, with an overlap set by offsetting the first code segment token. A script file containing code with a supported programming language syntax is split into code segments where a code segment contains a header or a sub-header.

For a source code file, the file is parsed into a concrete syntax tree. Each portion of the concrete syntax tree is extracted into a code segment. A syntax hierarchy defines the portions of the concrete syntax tree that are included in a code segment. A file is represented by multiple partially overlapping code segments defined by a syntax hierarchy. In an aspect, the syntax hierarchy identifies a code segment as a whole file, a whole class, and a single class method. (Collectively, block 504).

For each code segment (block 506), a code summary and predicted queries are generated for the code segment (block 508). A code summary is a natural language description of the code segment. A predicted query is a query that is likely to result in a response that produces the code segment. Both the code summary and the predicted queries are generated by the large language model given the code segment. The large language model is given a prompt that includes instructions to predict a code summary for the code segment and one or more predicted queries. The code segment and predicted queries become part of the metadata. (Collectively, block 508).

Additional metadata is then extracted from the file of the code segment to annotate the code segment (block 510). In an aspect, the additional metadata that is extracted from the file includes the filename of the file containing the code segment, the local file path of the file containing the code segment, the Git commit branch or hash of the location of the file containing the code segment, and the line number start of the code segment in the file containing the code segment. For class methods and objects in namespaces, the class and namespace information are extracted and included in the metadata for the code segment. The class and namespace information includes the name of the class, the name of the namespace, and the parent class of the class.

An embedding is then generated by an encoder using the metadata and the code segment (block 512). The embedding is used as an index to search the codebase segment table for the metadata and code segment. The index, metadata, and code segment are stored in the codebase segment table (block 514).

Turning back to FIG. 4, once the codebase segment table is created (block 402), it is deployed in an inference system (block 404). An inference system is any software application that uses code from a codebase, such as without limitation, an integrated development environment, a source code editor, a source code repository, a code search engine, or any browser-based service which involves viewing a source code project.

Figure 6:
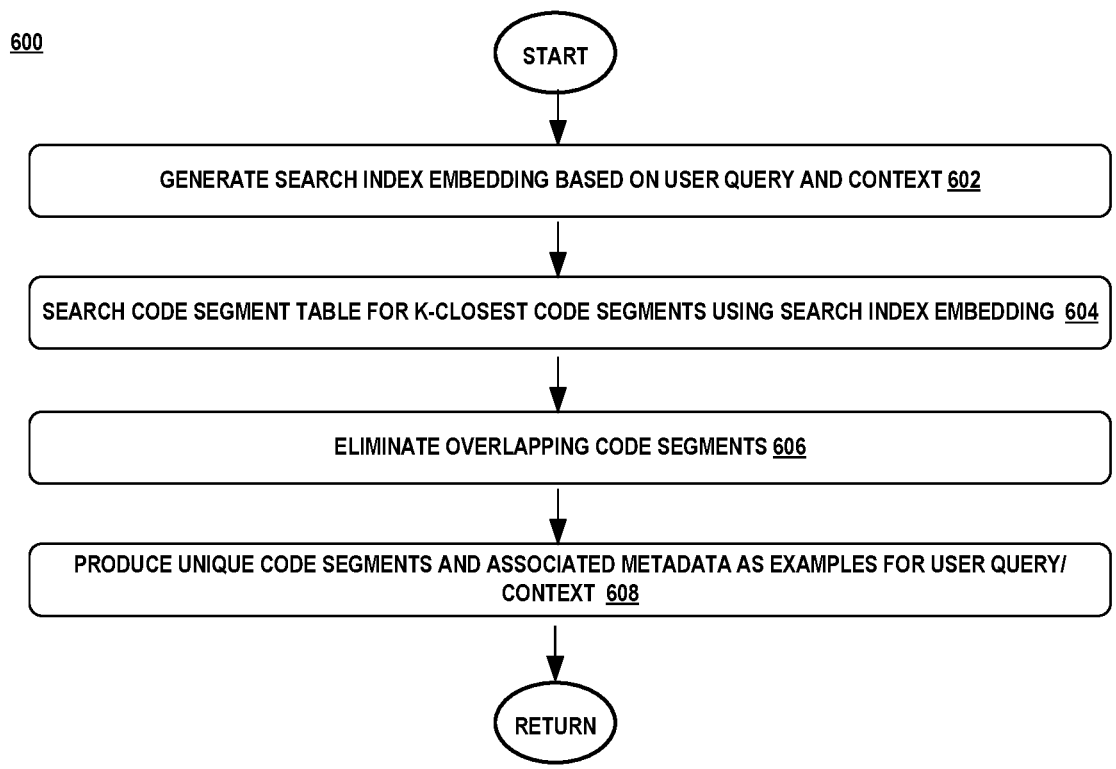
FIG. 6 is a flow chart illustrating an example of a method for searching the codebase segment table for closely-similar examples.

The inference system receives a user query and a context (block 406). The search engine searches the codebase segment table for examples that are similar to the user query and context (block 408). Turning to FIG. 6, there is shown an example of a method 600 for searching the codebase segment table for examples that are similar to the user query and context.

An embedding is generated using the encoder given the user query and the context (block 602). The search engine uses the embedding of the user query and context to find the closest embeddings from the codebase segment table. In an aspect, the search uses an approximate nearest neighbor search algorithm on the embedding tree index to find the embeddings in the codebase segment table having the closest similarity to the user query/context embedding. The metadata and code segments associated with the closest similar embeddings to the embedding of the user query and context are selected as examples (block 604).

There may be overlapping code in the examples due to the syntax hierarchy including an entire file and subsets of the file. The search engine eliminates code segments that are already contained in another example in order to utilize unique code segments (block 606). For example, if an example includes an entire file and another example contains a method in that file, the example containing the entire file is kept and the example with the method is eliminated. A separate graph data structure is kept which can look up whether any given code segment/metadata indices overlap, and whether one contains the other. The unique examples, which include code segments and their respective metadata, are then used in the prompt to the large language model (block 608).

Turning back to FIG. 4, once the examples are obtained (block 408), the prompt generator then constructs a prompt that includes the query, context, and the one or more examples (block 410). The prompt is applied to the large language model (block 412). The large language model returns a response (block 414) which is output or returned to the application or user interface requesting the query (block 416).

Figure 7:
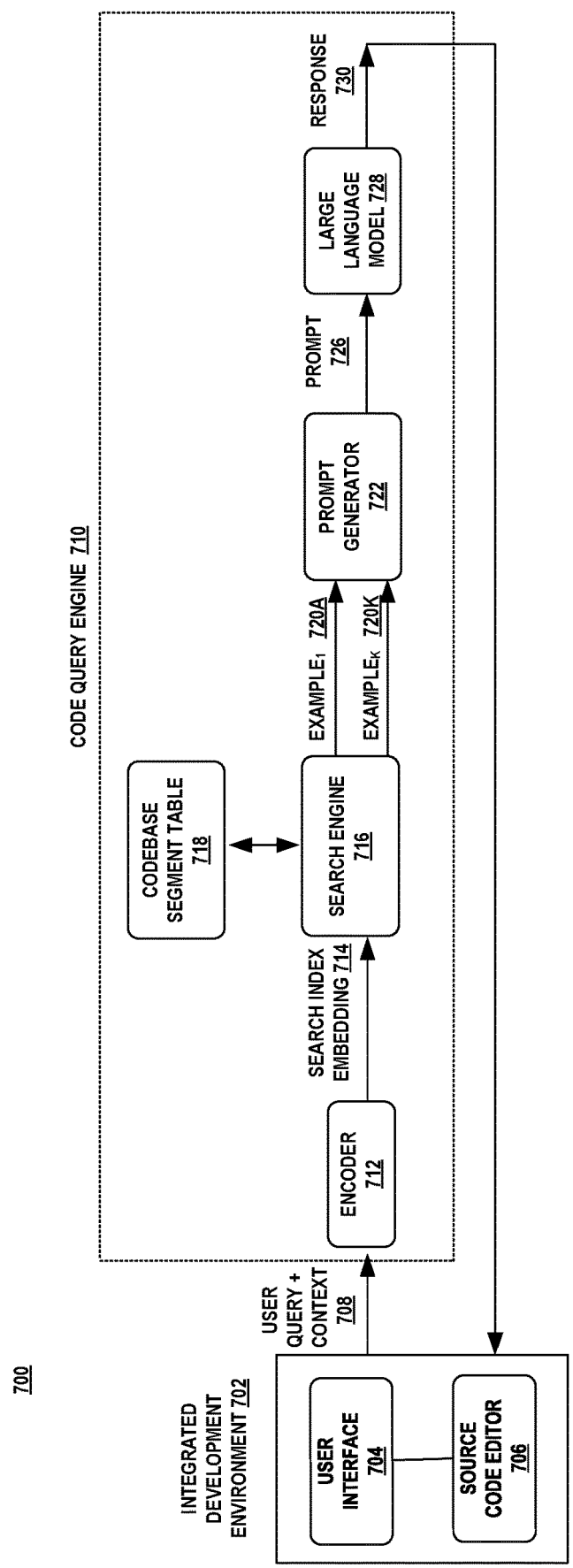
FIG. 7 is a schematic diagram illustrating an example of a first operating environment.

FIG. 7 illustrates an example of an inference system 700 that utilizes the code query engine 710. As shown in FIG. 7, the inference system is a software development tool such as an integrated development environment 702. The IDE 702 contains a user interface 704, source code editor 706, and the code query engine 710. The code query engine 710 may be a plug-in, add-in, or component that incorporates the query feature into the IDE. The code query engine 710 contains an encoder 712, search engine 716, codebase segment table 718, prompt generator 722, and the large language model 726.

A user using the IDE 702 may utilize the code query engine 710 to find an answer to a question that pertains to a particular codebase. The code query engine 710 receives a user query and a context 708 from the user interface 704 and generates a prompt 726 to the large language model 726. The encoder 712 generates a search index embedding 714 given the user query and context which is used by the search engine 716 to find examples 720A-720K from the codebase segment table 718. The prompt generator 722 then generates a prompt 726 which includes the user query, context, and the one or more examples. The large language model 728 generates a response given the prompt which is then returned to the user interface.

The techniques described herein may be used in any chatbot environment which requires that the conversational agent has the ability to view a whole codebase. This includes not just code search but any relevant task situated in a repository context, including but not limited to test generation, example generation, method generation, code review, bug fixing, and code optimization.

Exemplary Operating Environment

Figure 8:
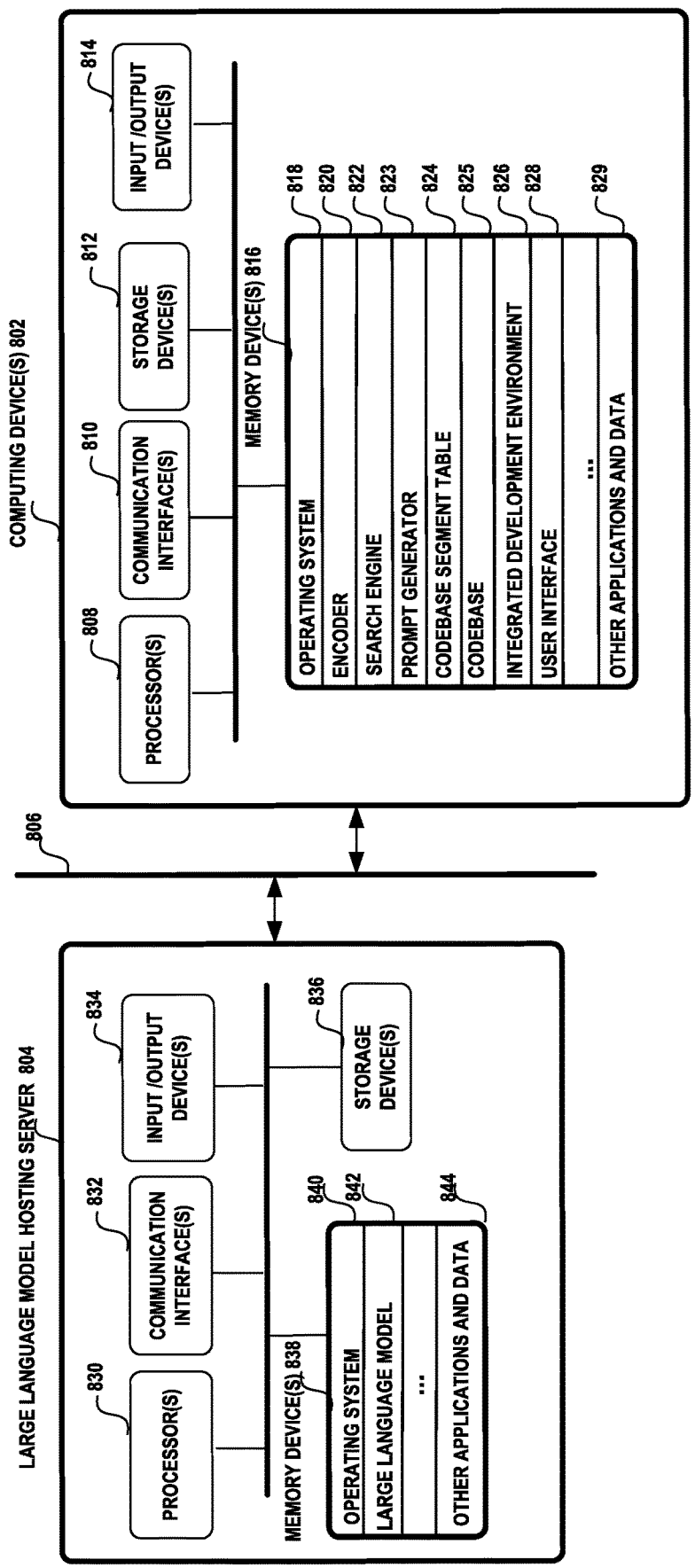
FIG. 8 is a block diagram illustrating an example of a second operating environment.

Attention now turns to a discussion of an example of an operating environment. FIG. 8 illustrates an example of an operating environment 800 in which a user computing device 802 is communicatively coupled through a network 806 to one or more computing devices 804 hosting the large language model.

A computing device 802, 804 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing device 802, 804 may include one or more processors 808, 830, one or more communication interfaces 810, 832, one or more storage devices 812, 836, one or more input/output devices 814, 834, and one or more memory devices 816, 838. A processor 808, 830 may be any commercially available or customized processor and may include dual microprocessors and multi-processor architectures. A communication interface 810, 832 facilitates wired or wireless communications between the computing device 802, 804 and other devices. A storage device 812, 836 may be a computer-readable medium that does not contain propagating signals, such as modulated data signals transmitted through a carrier wave. Examples of a storage device 812, 836 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 812, 836 in a computing device 802, 804. The input/output devices 814, 834 may include a keyboard, mouse, pen, voice input device, touch input device, display, speakers, printers, etc., and any combination thereof.

A memory device or memory 816, 838 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 816, 838 may also include one or more external storage devices or remotely located storage devices that do not pertain to propagated signals, such as modulated data signals transmitted through a carrier wave.

The memory device 816, 838 may contain instructions, components, and data. A component is a software program that performs a specific function and is otherwise known as a module, program, component, and/or application. Memory device 816 may include an operating system 818, an encoder 820, a search engine 822, a prompt generator 823, a codebase segment table 824, a codebase 825, an integrated development environment 826, a user interface 828, and other applications and data 829. Memory device 838 may include an operating system 840, a large language model 842, and other applications and data 844.

A computing device 802, 804 may be communicatively coupled via a network 806. The network 806 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 806 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect and Improvements

Aspects of the subject matter disclosed pertain to the reduction of user input of a computing device. The technical features associated with addressing this problem are the inclusion of the code segments similar to a query from the codebase in a prompt to the large language model. The technical effect achieved is the reduction of the number of prompts that a user makes to obtain a useful and relevant response thereby improving the user interface of the computing device.

The techniques described herein are an improvement over solutions that utilize a prompt to a large language model without the semantically-similar examples from the codebase at issue. The use of the examples improves the accuracy of the response with code elements and references from the codebase.

The search for the similar code segments to the query encompasses the metadata associated with a code segment. The metadata includes a natural language code summary in addition to source code. The inclusion of the code summary improves the model's prediction since both natural language text and source code is used in the example for the prompt instead of only source code. The summary and keywords enhance the connection in the embedding space between user queries which are natural language and code which is not natural language. Further, the file path and other metadata enables the model to see where each code segment lives in a codebase so it can be concretely referenced both in code and natural language responses.

One of ordinary skill in the art understands that the techniques disclosed herein are inherently digital. The operations to search the codebase segment table for examples, the generation of the prompt, and the application of large language model to generate answers to a query are inherently digital. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments (e.g., integrated development environment), and in testing labs for production environments as opposed to being mere thought experiments.

CONCLUSION

A system is disclosed comprising a processor and a memory. The memory stores a program configured to be executed by the processor. The program comprises instructions that when executed by the processor perform acts that: receive a query and a context from a user interface, wherein the query is related to data of a codebase, wherein the context identifies the codebase; search for an example that is similar to the query and context from code segments of the codebase, wherein the search is based on an embedding of the query and context similar to an embedding associated with a code segment of the codebase and metadata associated with the code segment; generate a prompt to a large language model, wherein the prompt comprises the query, the context of the query and the example; receive a response from the large language model given the prompt; and display the response in the user interface.

In an aspect, the metadata of the code segment comprises a natural language summarization of the code segment. In an aspect, the metadata of the code segment comprises a file name associated with the code segment. In an aspect the metadata of the code segment comprises a class definition associated with the code segment, a class associated with the code segment, and a method associated with the code segment. In an aspect, wherein the metadata includes a query associated with the code segment. In an aspect, the code segment is a file of the codebase, a method of the codebase or a class of the codebase. In an aspect, the large language model comprises a neural transformer model with attention.

A computer-implemented method is disclosed, comprising: obtaining a query and a context from a user interface, wherein the context identifies a codebase, wherein the query comprises a question related to the codebase; accessing a codebase segment table comprising a plurality of code segments, wherein a code segment of the plurality of code segments is accessed by an embedding of the code segment and associated metadata; searching for a code segment from the codebase segment table that is similar to the query, wherein the search is based on an embedding of the query and context being closely-similar to an embedding of a code segment and associated metadata from the codebase segment table; obtaining an answer to the query from a large language model given a prompt, wherein the prompt comprises the query, the context, and the similar code segment and associated metadata; and returning the answer to the user interface.

In an aspect, the code segment comprises a file from the codebase, a class from the codebase, or a method from the codebase. In an aspect, the metadata comprises a code summarization of the code segment. In an aspect, the metadata comprises a filename of the code segment and a local file path of a file containing the code segment. In an aspect, the metadata comprises predicted queries for the code segment generated by the large language model. In an aspect, the metadata of the code segment comprises a class definition associated with the code segment, a class associated with the code segment, and a method associated with the code segment. In an aspect, the large language model is a neural transformer model with attention. In an aspect, the answer comprises at least one code element from the codebase or a reference to a file of the codebase.

A hardware storage device is disclosed having stored thereon computer executable instructions that are structured to be executable by a processor of a computing device to thereby cause the computing device to perform actions that: obtain a query pertaining to data of a codebase from a user interface, wherein the query comprises an identifier of the codebase; access a large language model to generate a response to the query, wherein the large language model is given a prompt, the prompt comprising the query, the identifier of the codebase and an example from the codebase, wherein the example comprises a code segment from a file of the codebase and associated metadata, wherein the example comprises an embedding based on the code segment and associated metadata that is similar to an embedding of the query and identifier of the codebase; and return the response to the user interface.

In an aspect, the hardware device has computer executable instructions that are structured to be executable by the processor of the computing device to thereby cause the computing device to perform actions that: store code segments of files of the codebase in a codebase segment table, a code segment associated with metadata and indexed by an embedding of the code segment and metadata; and search the codebase segment table using the embedding of the code segment and metadata.

In an aspect the metadata includes a code summarization of the code segment, predicted queries of the code segment, a filename of a file containing the code segment, a file path of the file containing the code segment, and/or namespace data associated with the code segment. In an aspect, the code segment is a file of the codebase, a class of the codebase or a method of the codebase. In an aspect, the large language model is a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
a processor; and
a memory that stores a program configured to be executed by the processor, the program comprising instructions that when executed by the processor perform acts that:
receive a query and a context from a user interface of a source code editor, wherein the query is related to code elements from a codebase, wherein the context identifies the codebase;
access a codebase segment table, wherein the codebase segment table comprises a plurality of code segments from the codebase, wherein a code segment of the plurality of code segments is associated with metadata, wherein the metadata comprises a filename of the code segment, a local file path of the code segment, and a natural language summary of the code segment;
search for an example that is similar to the query and context from the plurality of code segments of the codebase stored in the codebase segment table, wherein the search is based on an embedding of the query and context similar to an embedding associated with a particular code segment of the codebase and metadata associated with the particular code segment;
generate a prompt to a large language model, wherein the prompt comprises the query, the context of the query and the example;
cause the large language model to generate a response to the query given the prompt;
receive a response from the large language model given the prompt; and
display the response in the user interface of the source code editor.

2. The system of claim 1, wherein the metadata of the code segment further comprises a Git commit branch.

3. The system of claim 1, wherein the metadata of the code segment further comprises a line number of a start of the code segment in a file of the codebase.

4. The system of claim 1, wherein the metadata of the code segment comprises a class definition associated with the code segment, a class associated with the code segment, and a method associated with the code segment.

5. The system of claim 1, wherein the metadata includes a query associated with the code segment.

6. The system of claim 1, wherein the code segment is a file of the codebase, a method of the codebase or a class of the codebase.

7. The system of claim 1, wherein the large language model comprises a neural transformer model with attention.

8. A computer-implemented method, comprising:
obtaining a query and a context from a user interface of a source code editor, wherein the context identifies a codebase, wherein the query comprises a question related to code elements from the codebase;
accessing a codebase segment table comprising a plurality of code segments, wherein a code segment of the plurality of code segments comprises metadata, wherein a code segment of the plurality of code segments is accessed by an embedding of the code segment and associated metadata, wherein the metadata comprises a filename of the code segment, a local file path of the code segment, and a natural language summary of the code segment;
searching for a code segment from the codebase segment table that is similar to the query, wherein the search is based on an embedding of the query and context being closely-similar to an embedding of a code segment and associated metadata from the codebase segment table;
generating a prompt to a large language model, wherein the prompt comprises the query, the context of the query and the code segment from the codebase segment table that is similar to the query;
causing the large language model to generate an answer to the query given the prompt;
obtaining the answer to the query-from the large language model given the prompt; and
returning the answer to the user interface of the source code editor.

9. The computer-implemented method of claim 8, wherein the code segment of the plurality of code segments from the codebase segment table comprises a file from the codebase, a class from the codebase, or a method from the codebase.

10. The computer-implemented method of claim 8, wherein the metadata comprises a Git commit branch.

11. The computer-implemented method of claim 8, wherein the metadata comprises class and namespace information for classes and objects in namespaces used in the code segment.

12. The computer-implemented method of claim 8, wherein the metadata comprises predicted queries for the code segment generated by the large language model.

13. The computer-implemented method of claim 8, wherein the metadata of the code segment of the plurality of code segments from the codebase segment table comprises a class definition associated with the code segment, a class associated with the code segment, and a method associated with the code segment.

14. The computer-implemented method of claim 8, wherein the large language model is a neural transformer model with attention.

15. The computer-implemented method of claim 8, wherein the answer comprises at least one code element from the codebase or a reference to a file of the codebase.

16. A hardware storage device having stored thereon computer executable instructions that are structured to be executable by a processor of a computing device to thereby cause the computing device to perform actions that:
   obtain a query pertaining to a code element of a codebase from a user interface of a source code editor;
   access a codebase segment table, wherein the codebase segment table comprises a plurality of code segments from the codebase, wherein a code segment of the plurality of code segments is associated with metadata, wherein the metadata comprises a filename of the code segment, a local file path of the code segment, and a natural language summary of the code segment;
   search for an example that is similar to the query and context from the plurality of code segments of the codebase stored in the codebase segment table, wherein the search is based on an embedding of the query and context similar to an embedding associated with a particular code segment of the codebase and metadata associated with the particular code segment;
   generate a prompt to a large language model, wherein the prompt comprises the query, the context of the query and the example;
   cause the large language model to generate a response to the query given the prompt;
   receive a response from the large language model given the prompt; and
   display the response in the user interface of the source code editor.

17. The hardware device of claim 16, wherein the metadata comprises a namespace associated with a particular code segment of the plurality of code segments stored in the codebase segment table.

18. The hardware device of claim 16, wherein the metadata comprises predicted queries of a particular code segment.

19. The hardware device of claim 16, wherein the plurality of code segments comprises a file of the codebase, a class of the codebase or a method of the codebase.

20. The hardware device of claim 16, wherein the large language model is a neural transformer model with attention.

* * * * *